US006468005B1

(12) United States Patent
Esper

(10) Patent No.: US 6,468,005 B1
(45) Date of Patent: Oct. 22, 2002

(54) APPARATUS FOR CONVEYING AND SEPARATING ARTICLES THROUGH A TRANSPORT TUBE

(75) Inventor: Leo J. Esper, Howell, MI (US)

(73) Assignee: Elopak Systems AG, Glattbrugg (CH)

( * ) Notice: Subject to any disclaimer, the term of this patent is extended or adjusted under 35 U.S.C. 154(b) by 44 days.

(21) Appl. No.: 09/645,414

(22) Filed: Aug. 24, 2000

(51) Int. Cl.[7] .............................................. B65G 51/36
(52) U.S. Cl. ............................ 406/31; 406/84; 406/95; 406/147
(58) Field of Search ............................. 406/31, 84, 94, 406/95, 147, 192, 194

(56) References Cited

U.S. PATENT DOCUMENTS

| | | | |
|---|---|---|---|
| 3,236,475 A | * 2/1966 | Mach et al. | 243/1 |
| 3,975,057 A | 8/1976 | Hurd | 302/31 |
| 3,999,806 A | 12/1976 | Hurd | 302/28 |
| 4,131,320 A | 12/1978 | Volat et al. | 302/2 R |
| 4,275,976 A | * 6/1981 | Sticht | 406/28 |
| 4,829,724 A | * 5/1989 | Miller et al. | 51/436 |

FOREIGN PATENT DOCUMENTS

EP 0 819 611 A2 * 1/1998 .......... B65B/61/18

* cited by examiner

Primary Examiner—Christopher P. Ellis
Assistant Examiner—Joe Dillon, Jr.
(74) Attorney, Agent, or Firm—Reising, Ethington, Barnes, Kisselle, Learman and McCulloch, PC

(57) ABSTRACT

An air mover apparatus for conveying and separating articles through a transport tube. A line-up of articles are supplied via a track from an orienting and feeding device and, thence, to a transport tube leading to a remote processing machine. The air mover is operatively connected between the track and the transport tube. Oppositely disposed converging air passages are formed in the air mover, adapted to receive compressed air from a suitable source and emit same to the interior of the air mover, to thereby draw each successive article therepast from the line-up and project same forward, creating a separation between adjacent articles while blowing the articles through the transport tube to the processing machine. An orifice may be formed upstream of the converging air passages, adapted to receive the compressed air to stall the articles to enhance the separation between adjacent articles.

14 Claims, 4 Drawing Sheets

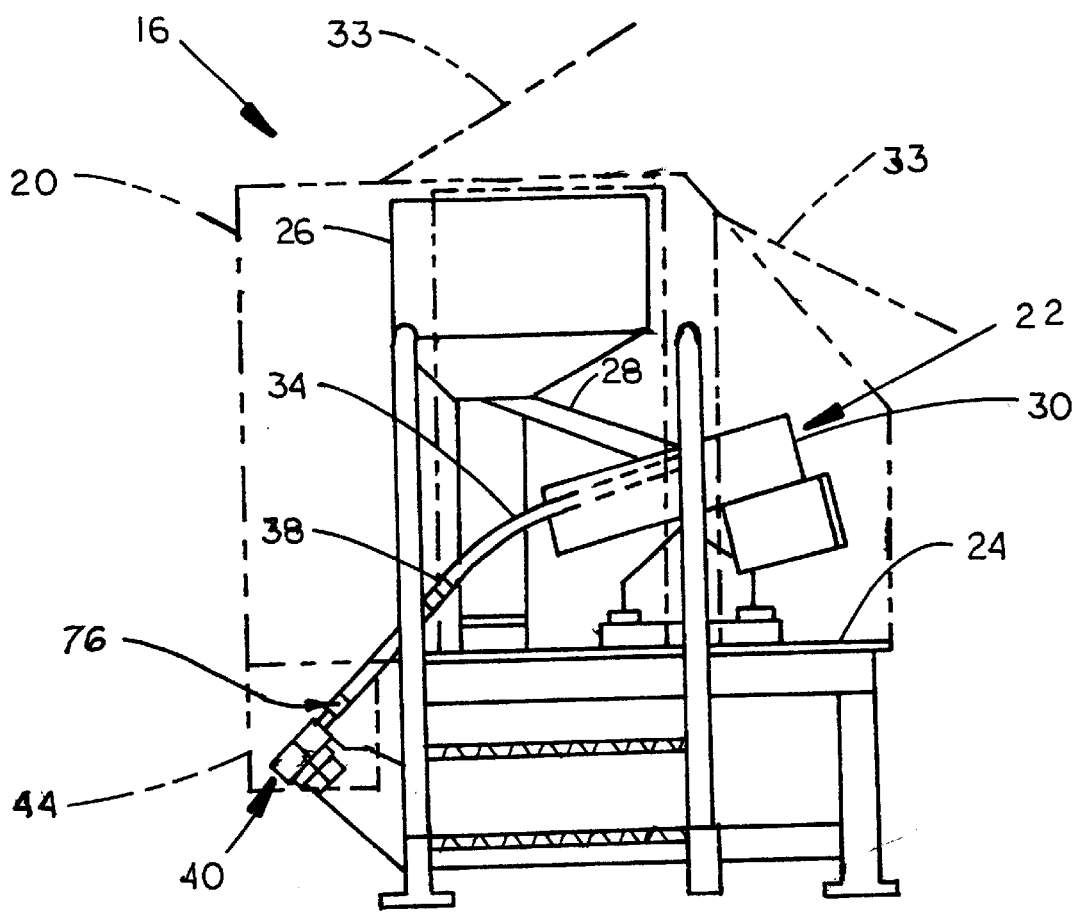
FIG. 2
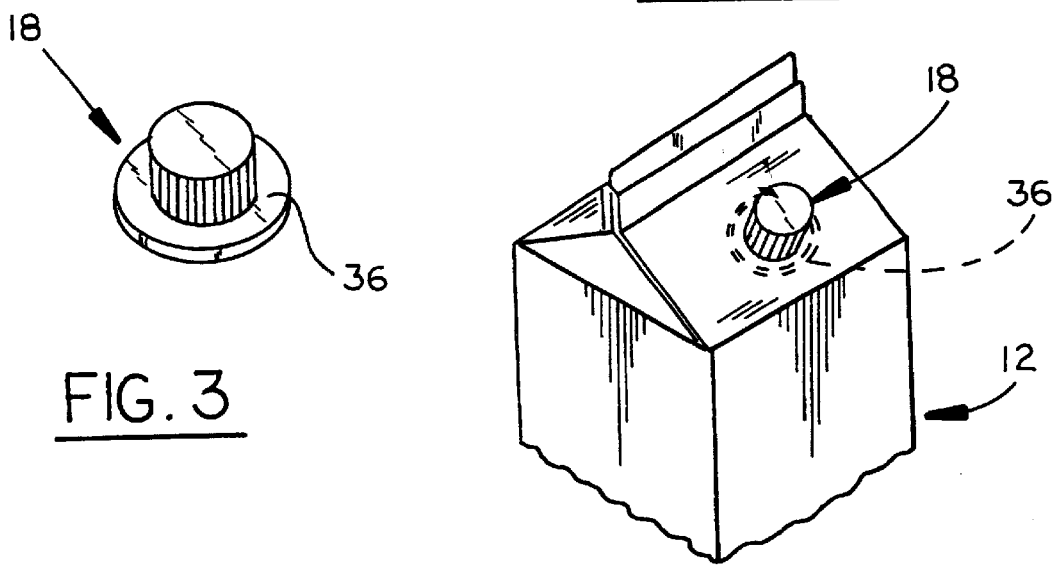
FIG. 3
FIG. 4

APPARATUS FOR CONVEYING AND SEPARATING ARTICLES THROUGH A TRANSPORT TUBE

TECHNICAL FIELD

This invention relates generally to pneumatic conveying and, more particularly, to developing spacing between parts during pneumatic conveying.

BACKGROUND OF THE INVENTION

Volat et al U.S. Pat. No. 4,131,320 discloses a conveyor device for conveying thin articles, such as assorted sizes and weights of mail, wherein equally spaced, oppositely disposed converging nozzles with rectangular outlets are formed substantially flush with the conveyor surface. As such, jets of pressure fluid issue from the outlets to provide a hovering height beneath the mail, and an axially longitudinal velocity component of fluid substantially equal to the rated progression speed of the articles of mail.

Hurd U.S. Pat. Nos. 3,975,057 and 3,999,806 each disclose multiple circular lift holes and upwardly angled directional slots formed in a convey or deck for issuing air under pressure for elevating and propelling aligned cartons or cup shaped articles along a predetermined path.

DISCLOSURE OF THE INVENTION

A general object of the invention is to provide an improved apparatus and method for pneumatic conveying of small plastic parts through enclosed tubes or tracks.

Another object of the invention is to provide an apparatus and method for pneumatic conveying and separating small plastic parts through tubes from an off-line orienting and feeding device to a form, fill and seal packaging machine.

A further object of the invention is to provide an air mover arrangement including inner and outer box-like segments, wherein four adjoining slots are formed in the inner segment, and an air inlet is formed in the outer segment in communication with one of the slots, and with converging passages formed through the walls of the inner segment from oppositely disposed slots therein.

A still further object of the invention is to provide such an air mover arrangement, wherein the converging passages function as high velocity jets to produce axially induced air to draw fitments into the air mover and then to accelerate or "shoot" same out of the air mover, creating a separation between adjacent fitments while being blown through an interconnected tube.

BRIEF DESCRIPTION OF THE DRAWINGS

FIG. 2 is a side elevational view of the off-line orienting and feeding device;

FIG. 3 is a perspective view of a part which may be handled by the device;

FIG. 4 is a perspective view of a liquid packaging carton with the part from FIG. 3 in place thereon;

BEST MODE OF CARRYING OUT THE INVENTION

Figure 1:
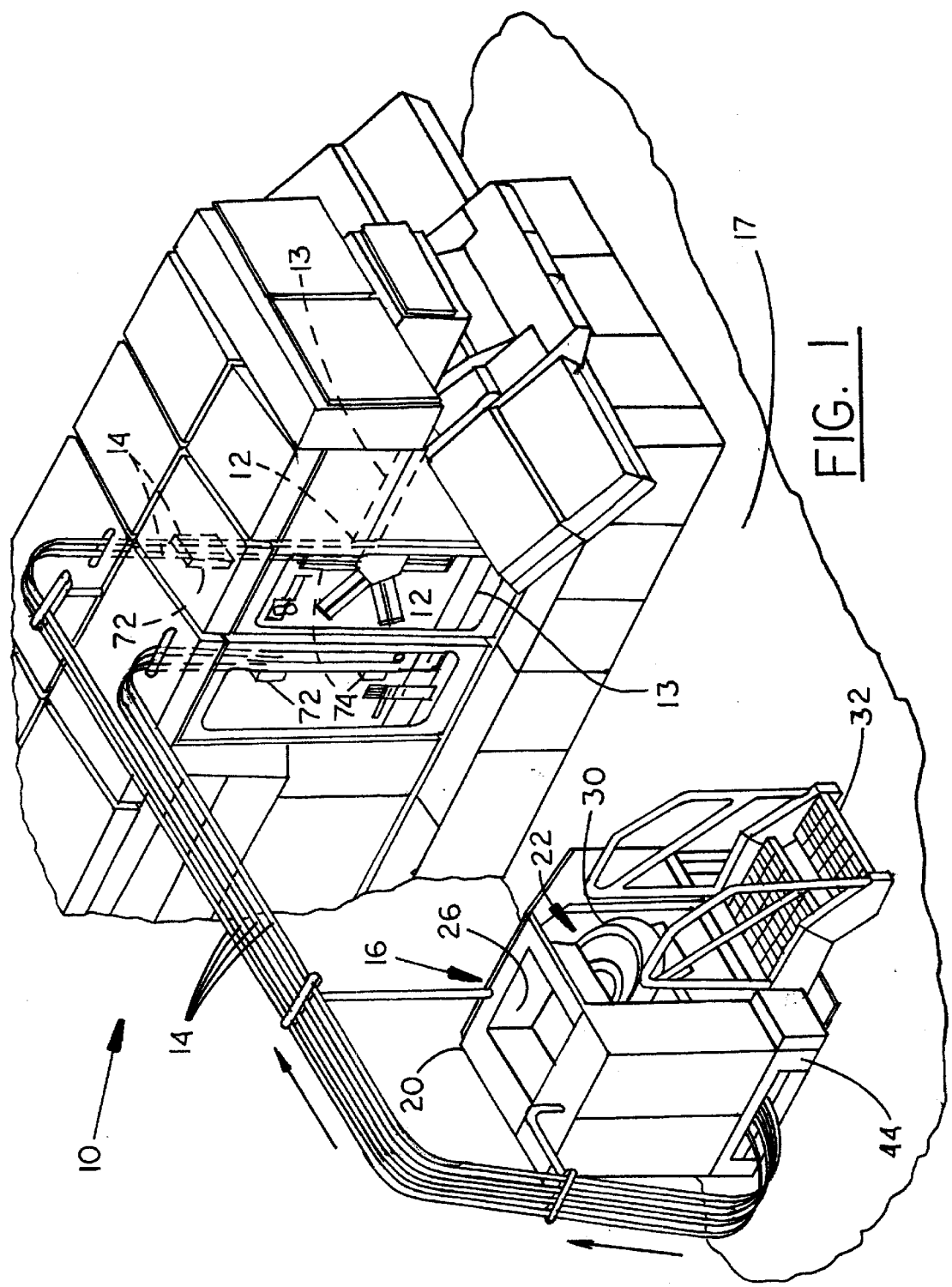
FIG. 1 is a perspective view of a form, fill and seal packaging machine and an associated off-line orienting and feeding device.

Referring now to the drawings in greater detail, FIG. 1 illustrates a form, fill and seal packaging machine 10 which processes cartons, represented at 12 and shown more clearly in FIG. 4. The cartons 12 are advanced through the machine in one row, or (as shown) a plurality of parallel rows, by one or more horizontal conveyors 13. A plurality of enclosed plastic tubes 14 extend to the machine 10 from an off-line orienting and feeding device 16. The machine 10 and the device 16 stand upon a floor 17 and are spaced apart. The device 16 serves to process parts in the form of identical pour spout fitments 18, of which one is shown in FIG. 3.

The device 16 (FIGS. 1 and 2) includes a housing 20, enclosing a parts feeder unit 22 mounted on a stand 24 (FIG. 2). A hopper 26 is mounted on the stand 24 so as to be located above the parts feeder unit 22, and is adapted to supply the fitments 18 via a connector member 28 to a bowl 30 of the parts feeder unit 22. Steps 32 at a side of the housing 20, permit an operator to fill the hopper 26 with parts, as needed, completely remote from the operating packaging machine 10. Covers, represented as 33 (FIG. 2), may be pivotally mounted over the hopper 26 and the bowl 30.

A stationary track 34 (FIG. 2) angles downwardly from the discharge end of the bowl 30. The bowl 30 is powered by any suitable means, causing the fitments 18 to move outwardly to encounter tracks, guide devices, rails, twists, cut-outs, air jets, or other elements (not shown) as required to cause each fitment 18 to be oriented, for example, by hanging by its flange 36 on rails, or, if incorrectly positioned, to be dropped or blown back into the bowl to be caused to return in another pass. The bowl 30 may be a bowl of a well-known centrifugal parts feeder, which, via centrifugal force created by rotary motion, urges the parts 18 towards and through orienting devices to orient the parts. Alternately, the bowl 30 may be a bowl of a well known, vibratory parts feeder, which causes the parts to travel, in response to vibration, around an upwardly spiraling track secured to the inside surface of the bowl wall, to become oriented while travelling past elements mounted along the track.

A photoelectric unit 37 and an air cylinder 38 (FIG. 2) are mounted at intermediate locations along the track 34, for a purpose to be described. A slide shuttle assembly 40 (FIG. 2) is positioned adjacent the exit end of the track 34. The slide shuttle assembly 40 is shown and described in U.S. application Ser. No. 09/066,416, and incorporated herein by reference.

A suitable fitment-detector, for example a limit switch or a photoelectric arrangement represented at 72 in FIG. 1, is operatively connected to each tube 14 at a predetermined point along the height thereof within the form, fill and seal packaging machine 10. The photoelectric unit 72 causes an escapement or pick-and-placement unit, represented at 74 and as shown and described in, for example, EP-A-0819611, to be supplied with fitments 18, as required.

In operation, the fitments 18 are supplied from the hopper 26 (FIG. 2) to the bowl 30, where the fitments are oriented and discharged into the inlet of the track 34. As such, a plurality of, say 25, fitments 18 are aligned at all times in the track 34 between the photoelectric unit 37 and the air cylinder 38.

Upon the release of fitments 18 by the air cylinder 38, the respective plurality of fitments exit from the end of the track 34, through an "air mover" 76, as will be explained and, thence, through an adjacent passage of the slide shuttle assembly 40 into its plastic tube 14. As called for by the respective photoelectric units 72 (FIG. 1) at the other end of the tubes 14, the assembly 40 is caused to move laterally so as to align the track 34 with the respective tubes 14. A blast of compressed air (to be explained) sends the fitments 18 now in the adjacent tube 14, firstly downwardly to exit from the housing 20 (FIG. 1), then upwardly, across the horizontal gap between the device 16 and the machine 10 at a level above the device and the machine and above any pedestrian or vehicular traffic along the gap, and down the tube past the photoelectric unit 72. Each photo-electric unit 72 includes a delay whereby parts falling past the unit do not actuate it. However, once the fitments 18 are filled to the point of stopping adjacent the unit 72, a signal therefrom stops the blowing of fitments through its particular tube 14. Then, when the line-up of fitments, which may extend well above the unit 72, drops below the unit 72 owing to the consumption thereof by the unit 74, the unit 72 signals for another batch of fitments to be released by the air cylinder 38 into and through the slide shuttle assembly 40 to a tube 14. In lieu of a single delay-type photoelectric unit 72, a pair of upper and lower photoelectric units or limit switches could be used.

As any of the photoelectric units 72 calls for fitments 18, the signal results in the alignment of the correct tube 14 with a passage of the slide shuttle assembly 40, and the air cylinder 38 on the fixed track 34 to release fitments 18 thereto, and thence through the tube 14 to stack up adjacent and above the specific photoelectric unit.

Figure 5:
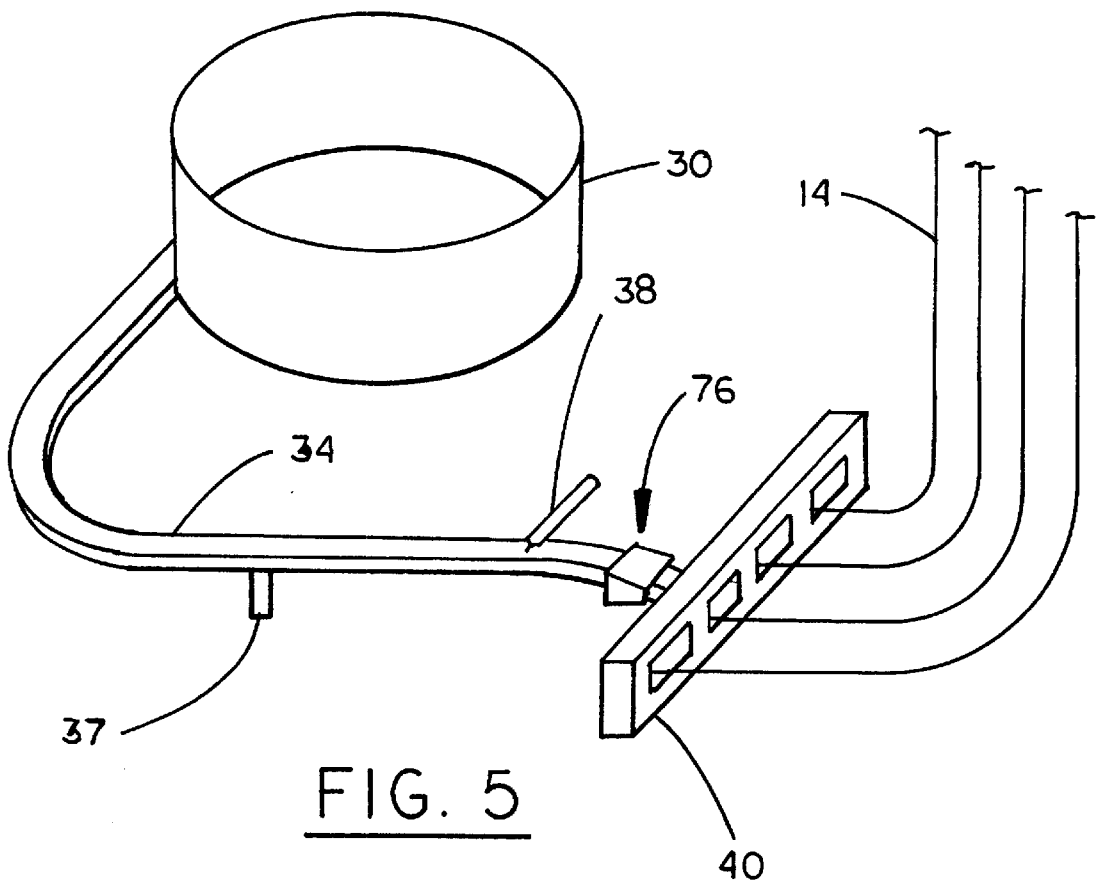
FIG. 5 is a perspective view of components of the device in FIG. 2 which embody the invention.
Figure 6:
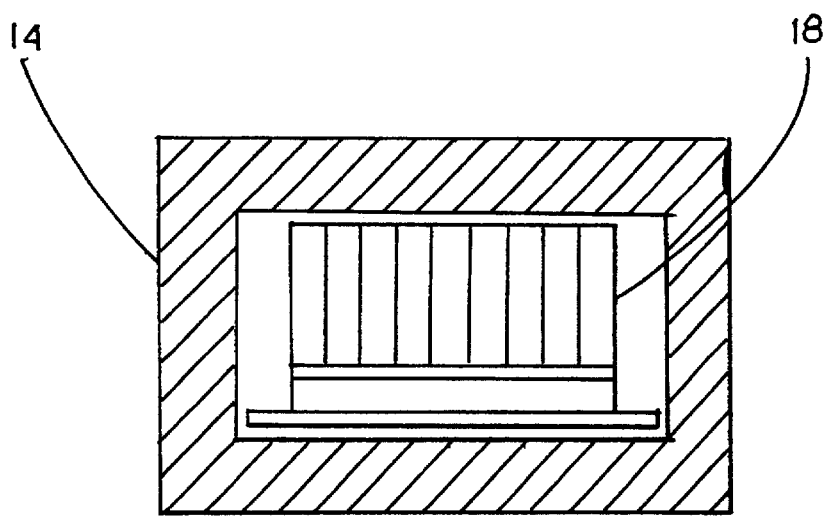
FIG. 6 is an enlarged cross-sectional view of a transport tube carrying the part shown in FIG. 3.

Referring now to FIGS. 5–9, it is noted in FIG. 5 that, intermediate the air cylinder 38 and the slide shuttle assembly 40, the "air mover" 76 serves to eliminate or substantially reduce the possibility of an abutting line of fitments 18 from wedging or bunching up within the tube 14 confinement, and, thereby, creating high frictional forces against the tube walls. The latter, over time, may cause plastic ribbon-like debris to accumulate on the walls to interfere with fitment flow therethrough.

Figure 7:
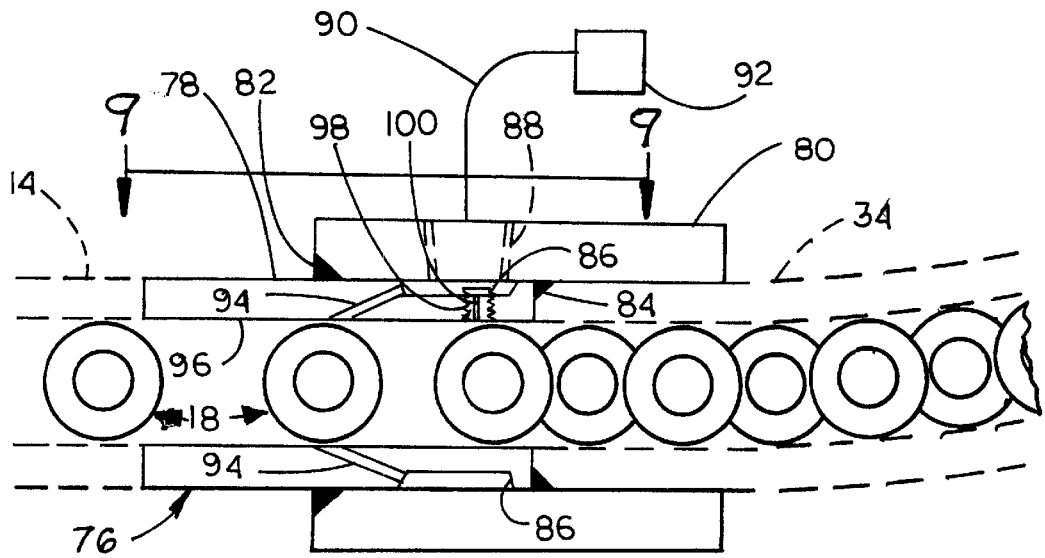
FIG. 7 is a cross-sectional view of the inventive air mover portion of FIG. 5, with a plurality of parts therein.
Figure 8:
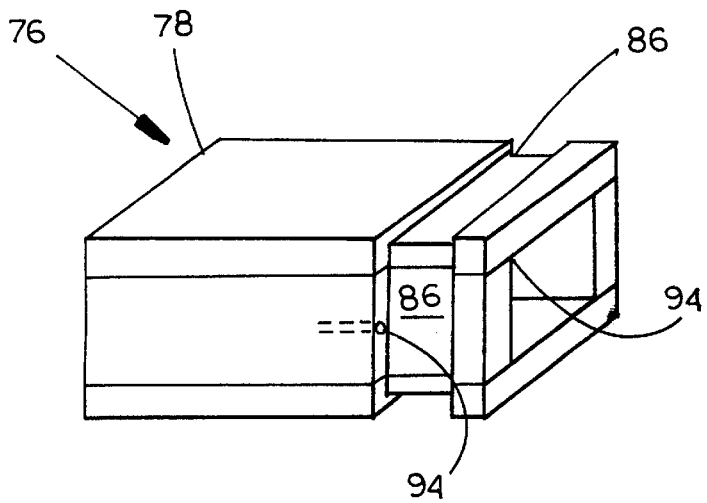
FIG. 8 is a perspective view of the inner portion of the FIG. 7 air mover.
Figure 9:
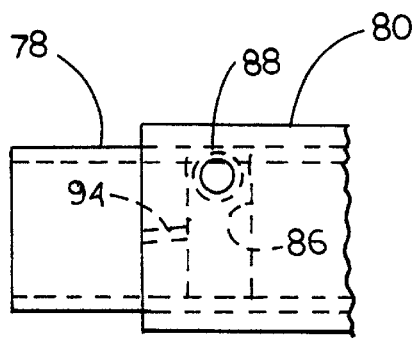
FIG. 9 is a view taken along the plane of line 9—9 of FIG. 7, and looking in the direction of the arrows.

The air mover 76 comprises a segment 78 having a rectangular cross-section and length which connects at its ends to the distal end of the track 34 and an inlet to the slide shuttle assembly 40. A surrounding segment 80 is slid partially onto the segment 78 and secured thereto such as by welding, represented at 82 and 84. Four interconnecting lateral slots 86 are formed in the segment 78, one of which is adjacent a threaded opening 88 formed in the segment 80. The opening 88 is suitable for connection with a passage represented as 90, leading from a source 92 of high efficiency particulate air (HEPA). A pair of converging passages 94 are formed from downstream edges of two oppositely disposed slots 86 to the inner walls 96 of the segment 78, at approximately the mid height of the segment, as shown in FIG. 7. The passages 94 are each formed at a predetermined angle, preferably at 20° with the respective inner walls 96, but may vary between approximately 20° to 30°, depending upon the fitment application.

In the above described configuration, the passages 94 serve as high velocity jets, wherein compressed air from the source 92 communicating through the inlet 88, the slots 86, and the passages 94 produces a venturi effect. As such, ambient air in the track 34 is induced to push the line-up of fitments 18 one at a time through the "front" formed by the converging air flows from the angled passages 94. Upon passing through such front, the dual air flows serve to accelerate or "shoot" each fitment forwardly, creating a separation between adjacent fitments while being blown through a respective tube 14.

Depending upon the lengths of the tubes 14, additional air movers 76 may be required at predetermined intervals therealong. However, tests have shown that for vertical and horizontal total lengths of up to sixty feet, the spacing between adjacent parts remains constant.

Referring now to FIG. 7, a set screw 98 with an axial orifice 100 formed therethrough may be mounted through the wall of the segment 78 so as to communicate between the slot 86 and the inner wall 96 of the segment 78. The set screw 98 is spaced a predetermined distance away from the plane of the outlets of the angled passages 94. Alternately, for some applications, an orifice 100 or, preferably, a set screw 98 with an orifice 100 may be positioned upstream of the air mover 76 in a wall of the track 34, in lieu of, or in addition to, the set screw in the segment 78. For this upstream location, HEPA air should be provided.

Depending upon the size of specific fitments 18, different set screws 98 with varied diameter orifices 100 may be used. When used, the purpose of such orifices 100 is to provide a low pressure "air front", serving to stall the line-up of fitments 18 behind the first fitment being pushed through the converging air flows. This feature, in effect, fine tunes the air mover 76 to develop a greater separation between adjacent fitments.

Industrial Applicability

It should be apparent that the invention provides a novel method of spacing apart fitments being blown through a transport tube to thereby prevent bunching up of the fitments within the tube, creating high frictional forces against the tube walls, tending to cause debris to accumulate on the walls to interfere with production.

It should be further apparent that the invention provides an apparatus for conveying and separating moving parts in a transport tube, wherein such apparatus may be readily adapted to an existing transport tube.

It should be still further apparent that the spacing between fitments being blown through enclosed transport tubes may be varied to suit fitment diameters and heights, converging air passage angles, the pressure of the air flow, and where necessary, the height of the transport tube.

While but one general embodiment of the invention has been shown and described, other modifications thereof are possible within the scope of the following claims.

What is claimed is:

1. An air mover for use in conjunction with a transport tube that provides fluid communication between a device for orienting and feeding a line-up of parts to the tube and a processing machine, the air mover comprising:
   a pneumatic conveyor configured to pneumatically convey the parts through the transport tube when the air mover is operably connected to the transport tube; and
   a part blocker configured to provide separation between parts by stalling a line-up of parts and releasing one part at a time, the part blocker comprising an air jet aimed into the path of the parts upstream from the pneumatic conveyor.

2. The air mover described in claim 1, wherein the conveyor includes an inlet for air under pressure, and at least one air jet operatively connected to said inlet and extending forwardly to the interior of the air mover for causing each successive part to be blown forward and separated from the following line-up of parts.

3. The air mover described in claim 2, wherein said at least one air jet comprises oppositely disposed converging air jets.

4. The air mover described in claim 1, wherein the conveyor includes:
- an inlet for air under pressure, outer and inner segments, with the inlet formed through a wall of the outer segment,
- an annular groove formed in the inner segment in communication with the inlet, and
- converging passages formed through oppositely disposed walls of the inner segment in communication with the annular groove.

5. The air mover described in claim 4, wherein the air jet includes an orifice formed axially through a setscrew mounted in a position providing fluid communication between the annular groove and an inner surface of the inner segment upstream of the converging passages.

6. A part feeder comprising:
- a transport tube connected to a processing machine;
- a part orientation and feeding device connected to the transport tube and configured to orient and feed a line-up of parts to the processing machine through the transport tube; and
- an air mover operatively connected to the transport tube and configured to convey parts through the transport tube to the processing machine, the air mover comprising:
  - a pneumatic conveyor configured to pneumatically convey the parts through the transport tube; and
  - a part blocker configured to provide separation between parts by stalling a line-up of parts and releasing one part at a time, the part blocker comprising an air jet aimed into the path of the parts upstream from the pneumatic conveyor.

7. The part feeder described in claim 6 in which:
- the orientation and feeding device is configured to orient and feed a line-up of pour spout fitments to the processing machine through the transport tube; and
- the pneumatic conveyor is configured to both pneumatically separate and convey the fitments through the transport tube.

8. The part feeder described in claim 6 in which the orientation and feeding device includes a track having a spaced apart photoelectric unit and air cylinder configured to retain and release a predetermined number of fitments to the air mover.

9. The part feeder described in claim 6 in which the conveyor includes an inlet for air under pressure, and at least one air jet operatively connected to the inlet and extending forwardly to an interior chamber of the air mover and configured to blow each successive part forward and separate each part from a following line-up of parts.

10. The part feeder described in claim 9 in which the at least one air jet comprises oppositely disposed converging air jets.

11. The part feeder described in claim 12 in which the conveyor includes:
- an inlet for air under pressure;
- outer and inner segments, with the inlet formed through a wall of the outer segment;
- an annular groove formed in the inner segment in communication with the inlet; and
- converging passages formed through oppositely disposed walls of the inner segment in communication with the annular groove.

12. The part feeder described in claim 11 in which the air jet includes an axial orifice formed through a wall of the inner segment and positioned to provide fluid communication between the inlet and an inner surface of the inner segment upstream of the converging passages.

13. An air mover for use in conjunction with a transport tube that provides fluid communication between a device for orienting and feeding a line-up of pour spout fitments to the tube and a processing machine, the air mover comprising a pneumatic conveyor that pneumatically separates and conveys the fitments through the transport tube when the air mover is operably connected to such transport tube.

14. The air mover described in claim 13, wherein said orienting and feeding device includes a track having a spaced apart photoelectric unit and air cylinder for retaining and releasing a predetermined number of fitments to the air mover.

* * * * *